(12) United States Patent
Furuta et al.

(10) Patent No.: US 11,107,426 B2
(45) Date of Patent: Aug. 31, 2021

(54) DISPLAY APPARATUS AND CONTROL METHOD THEREFOR

(71) Applicant: CANON KABUSHIKI KAISHA, Tokyo (JP)

(72) Inventors: Hirotaka Furuta, Yokohama (JP); Mitsuru Tada, Machida (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 46 days.

(21) Appl. No.: 16/295,301

(22) Filed: Mar. 7, 2019

(65) Prior Publication Data
US 2019/0279581 A1 Sep. 12, 2019

(30) Foreign Application Priority Data
Mar. 8, 2018 (JP) .............................. JP2018-042173

(51) Int. Cl.
*G09G 3/36* (2006.01)
*G02F 1/13357* (2006.01)
*G02F 1/1347* (2006.01)

(52) U.S. Cl.
CPC .............. *G09G 3/36* (2013.01); *G02F 1/1336* (2013.01); *G02F 1/13471* (2013.01); *G02F 2203/01* (2013.01); *G09G 2300/023* (2013.01); *G09G 2360/16* (2013.01)

(58) Field of Classification Search
None
See application file for complete search history.

(56) References Cited

U.S. PATENT DOCUMENTS 8,009,248 B2 8/2011 Nakai et al.
2009/0051707 A1* 2/2009 Hirata .................. G09G 3/3648
345/690

FOREIGN PATENT DOCUMENTS

JP 2008-191269 A 8/2008
JP 2018-041056 A 3/2018

* cited by examiner

*Primary Examiner* — Amare Mengistu
*Assistant Examiner* — Sarvesh J Nadkarni
(74) *Attorney, Agent, or Firm* — Cowan, Liebowitz & Latman, P.C.

(57) ABSTRACT

A display apparatus includes: a backlight module; a first panel configured to transmit light irradiated from the backlight module; a second panel configured to display an image on a screen by transmitting the light transmitted through the first panel; and a control unit configured to control a transmittance of the first panel based on a second image generated by applying smoothing to at least a part of a first image. A strength of smoothing applied to a first region of the first image corresponding to a center of the screen is lower than a strength of smoothing applied to a second region of the first image, the second region being different from the first region.

21 Claims, 13 Drawing Sheets

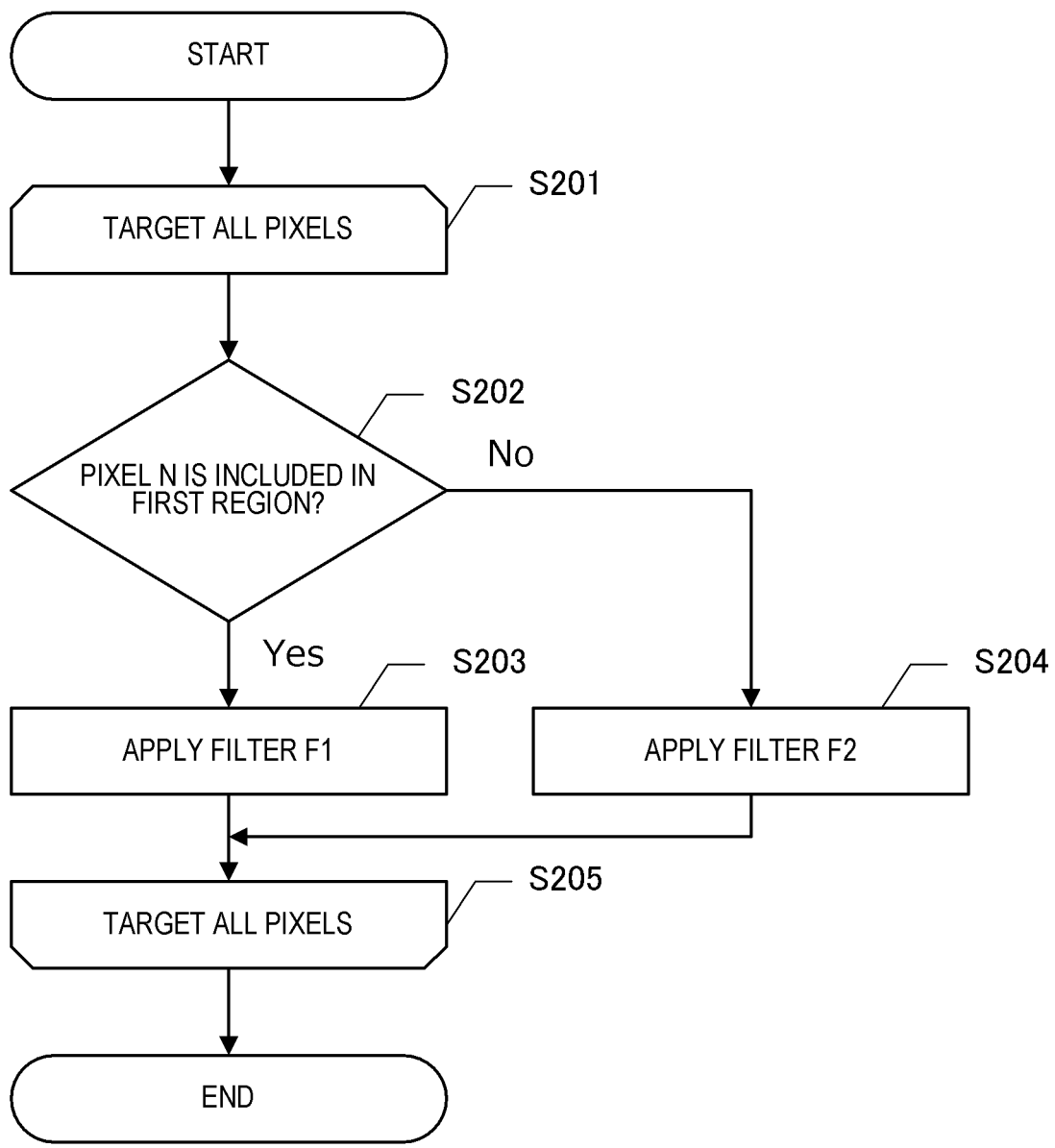

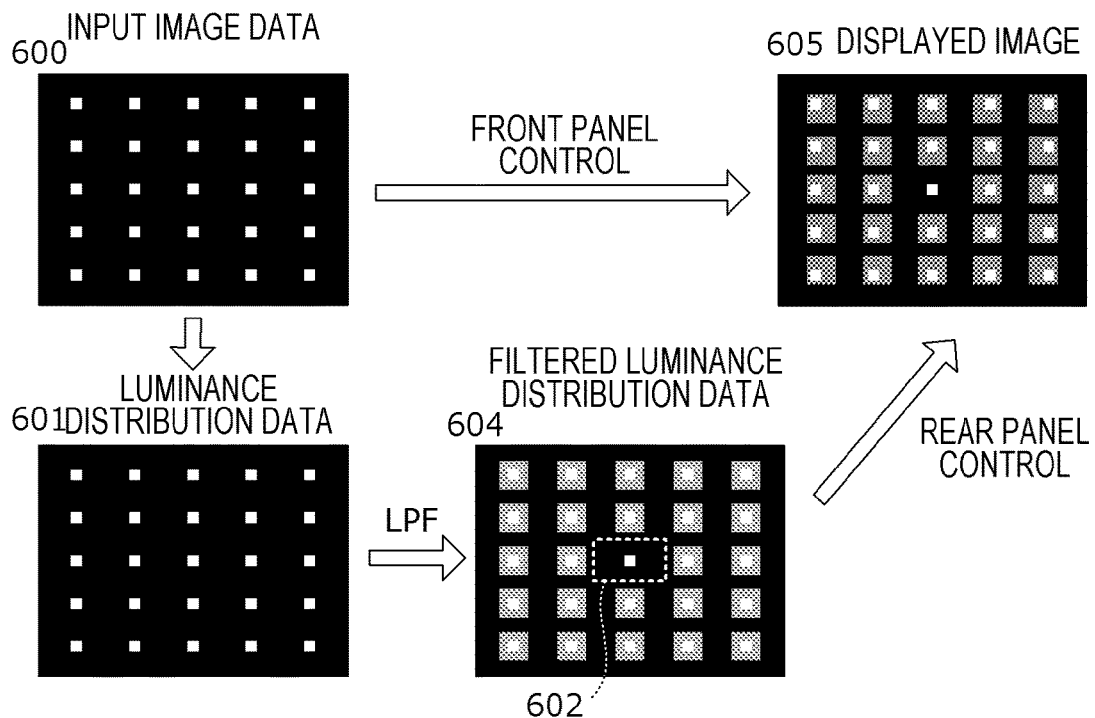

(0,0,0,0,0,0,0,0,0,1,1,1,0)

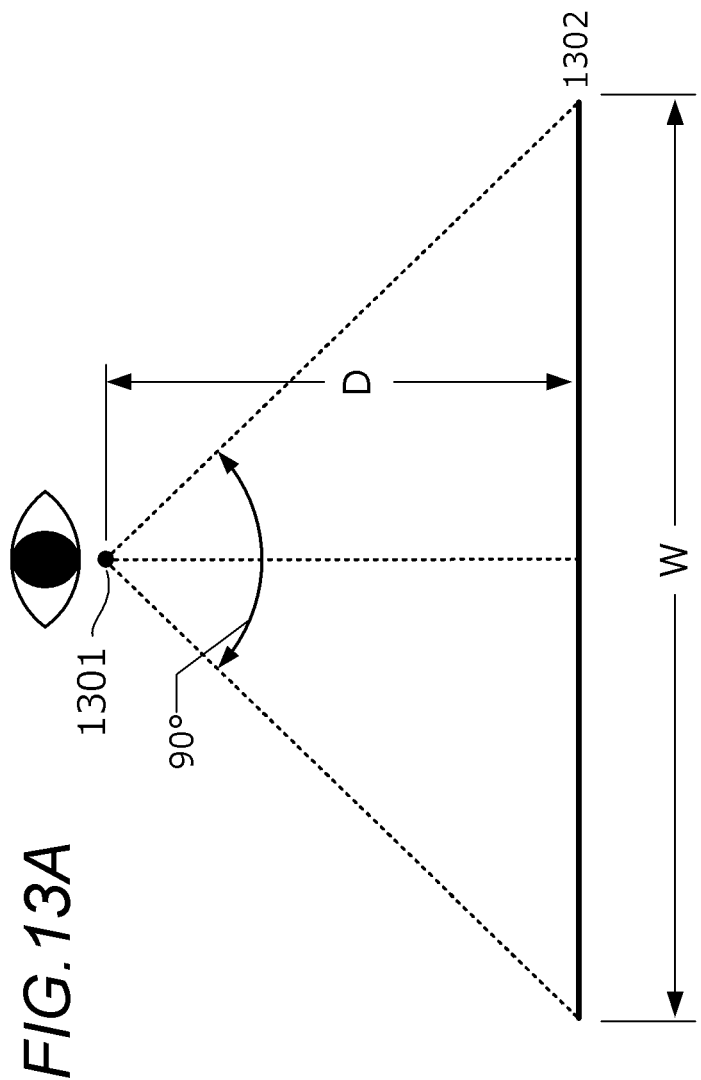

DISPLAY APPARATUS AND CONTROL METHOD THEREFOR

BACKGROUND OF THE INVENTION

Field of the Invention

The present invention relates to a display apparatus including a backlight and at least two transmissive panels which transmit the light of the backlight, and to a control method therefor.

Description of the Related Art

In recent years, images expressed in a high dynamic range (HDR), which is a more realistic dynamic range, are more frequently used on filming locations and video production sites. Active development of devices to display these images is ongoing, and one of such devices is a double-layered liquid crystal display device which displays images using a double-layered liquid crystal panel.

The double-layered liquid crystal panel is constituted by a front liquid crystal panel on the user side, and a rear liquid crystal panel, which is between the front liquid crystal panel and a light source on the back side (backlight). The front liquid crystal panel has three primary (red, green, blue) color filters, and expresses video data. The rear liquid crystal panel is controlled to reduce leaked light, which is primarily caused by the characteristic of the liquid crystals in a dark area, based on the luminance (brightness) components of the video data. Thereby with the double-layered liquid crystal panel, leaked light can be sufficiently reduced even when a high luminance region and a low luminance region are adjacent to each other, and local contrast can be enhanced. As a result, a high contrast between the dark area and the light area can be observed in a natural image.

On the other hand, in the case of the double-layered liquid crystal panel, an interference image having a double-contour may appear in a portion where a high luminance region and a low luminance region are adjacent to each other (hereafter called a double image or a double-contour interference).

U.S. Pat. No. 8,009,248 discloses a method of reducing the generation of moire in the double-layered liquid crystal panel by applying a spatial low-pass filter to an image for the rear liquid crystal panel, so as to differentiate between the spatial frequency of the image for the front liquid crystal panel and of the image for the rear liquid crystal panel become different.

SUMMARY OF THE INVENTION

The present inventors discovered by experiments that the double-contour interference can be reduced by applying a spatial low-pass filter to an image for the rear liquid crystal panel, as described in U.S. Pat. No. 8,009,248. However, it also became clear that by simply applying a low-pass filter creates another problem, that is, a halo (a hazy bright region) appears around a high luminance region.

With the foregoing in view, it is an object of the present invention to provide a technique to display a high quality image by reducing both the double image and the halo appropriately.

The present invention may provide a display apparatus comprising: a backlight module; a first panel configured to transmit light irradiated from the backlight module; a second panel configured to display an image on a screen by transmitting the light transmitted through the first panel; and a control unit configured to control a transmittance of the first panel based on a second image generated by applying smoothing to at least a part of a first image, wherein a strength of smoothing applied to a first region of the first image corresponding to a center of the screen is lower than a strength of smoothing applied to a second region of the first image, the second region being different from the first region.

The present invention may provide a display apparatus comprising: a backlight module; a first panel configured to transmit light irradiated from the backlight module; a second panel configured to display an image on a screen by transmitting the light transmitted through the first panel; a setting unit configured to set a first region and a second region in accordance with input by a user; and a control unit configured to control a transmittance of the first panel based on a second image generated by applying smoothing to at least a part of a first image, wherein a strength of smoothing applied to the first region of the first image is lower than a strength of smoothing applied to the second region of the first image.

The present invention may provide a display apparatus comprising: a backlight module; a first panel configured to transmit light irradiated from the backlight module; a second panel configured to display an image on a screen by transmitting the light transmitted through the first panel; and a detecting unit configured to detect a position of a viewpoint of a user; and a control unit configured to control a transmittance of the first panel based on a second image generated by applying smoothing to at least a part of a first image, wherein a strength of smoothing applied to a first region of the first image corresponding to a position on the screen facing the user is lower than a strength of smoothing applied to a second region of the first image, the second region being different from the first region.

The present invention may provide a control method for a display apparatus which includes: a backlight module; a first panel configured to transmit light irradiated from the backlight module; and a second panel configured to display an image on a screen by transmitting the light transmitted through the first panel, the control method comprising: a step of generating a second image by applying smoothing to at least a part of a first image; and a step of controlling a transmittance of the first panel based on the second image, wherein in the step of generating the second image, a strength of smoothing applied to a first region of the first image corresponding to a center of the screen is lower than a strength of smoothing applied to a second region of the first image, the second region being different from the first region.

The present invention may provide a control method for a display apparatus which includes: a backlight module; a first panel configured to transmit light irradiated from the backlight module; and a second panel configured to display an image on a screen by transmitting the light transmitted through the first panel, the control method comprising: a step of setting a first region and a second region in accordance with input by a user; a step of generating a second image by applying smoothing to at least a part of a first image; and a step of controlling a transmittance of the first panel based on the second image, wherein in the step of generating the second image, a strength of smoothing applied to the first region of the first image is lower than a strength of smoothing applied to the second region of the first image.

The present invention may provide a control method for a display apparatus which includes: a backlight module; a first panel configured to transmit light irradiated from the backlight module; and a second panel configured to display an image on a screen by transmitting the light transmitted through the first panel, the control method comprising: a step of detecting a position of a viewpoint of a user; a step of generating a second image by applying smoothing to at least a part of a first image; and a step of controlling a transmittance of the first panel based on the second image, wherein in the step of generating the second image, a strength of smoothing applied to a first region of the first image corresponding to a position on the screen facing the user is lower than a strength of smoothing applied to a second region of the first image, the second region being different from the first region.

The present invention may provide a non-transitory computer readable medium storing a program, the program causing a processor of a display apparatus, which includes: a backlight module; a first panel configured to transmit light irradiated from the backlight module; and a second panel configured to display an image on a screen by transmitting the light transmitted through the first panel, to execute: a step of generating a second image by applying smoothing to at least a part of a first image; and a step of controlling a transmittance of the first panel based on the second image, wherein in the step of generating the second image, a strength of smoothing applied to a first region of the first image corresponding to the center of the screen is lower than a strength of smoothing applied to a second region of the first image, the second region being different from the first region.

The present invention may provide a non-transitory computer readable medium storing a program, the program causing a processor of a display apparatus, which includes: a backlight module; a first panel configured to transmit light irradiated from the backlight module; and a second panel configured to display an image on a screen by transmitting the light transmitted through the first panel, to execute: a step of setting a first region and a second region in accordance with input by a user; a step of generating a second image by applying smoothing to at least a part of a first image; and a step of controlling a transmittance of the first panel based on the second image, wherein in the step of generating the second image, a strength of smoothing applied to the first region of the first image is lower than a strength of smoothing applied to the second region of the first image.

The present invention may provide a non-transitory computer readable medium storing a program, the program causing a processor of a display apparatus, which includes: a backlight module; a first panel configured to transmit light irradiated from the backlight module; and a second panel configured to display an image on a screen by transmitting the light transmitted through the first panel, to execute: a step of detecting a position of a viewpoint of a user; a step of generating a second image by applying smoothing to at least a part of a first image; and a step of controlling a transmittance of the first panel based on the second image, wherein in the step of generating the second image, a strength of smoothing applied to a first region of the first image corresponding to a position on the screen facing the user is lower than a strength of smoothing applied to a second region of the first image, the second region being different from the first region.

According to the present invention, a high quality image can be displayed by reducing both the double image and the halo appropriately.

Further features of the present invention will become apparent from the following description of exemplary embodiments with reference to the attached drawings.

BRIEF DESCRIPTION OF THE DRAWINGS

FIG. 2 is a flow chart according to Embodiment 1;

FIG. 6A to FIG. 6C are diagrams depicting a modification of the filter applying processing according to Embodiment 1;

FIG. 13A and FIG. 13B are diagrams depicting an example of a filter according to Embodiment 3.

DESCRIPTION OF THE EMBODIMENTS

Configuration of Display Apparatus

Figure 10:
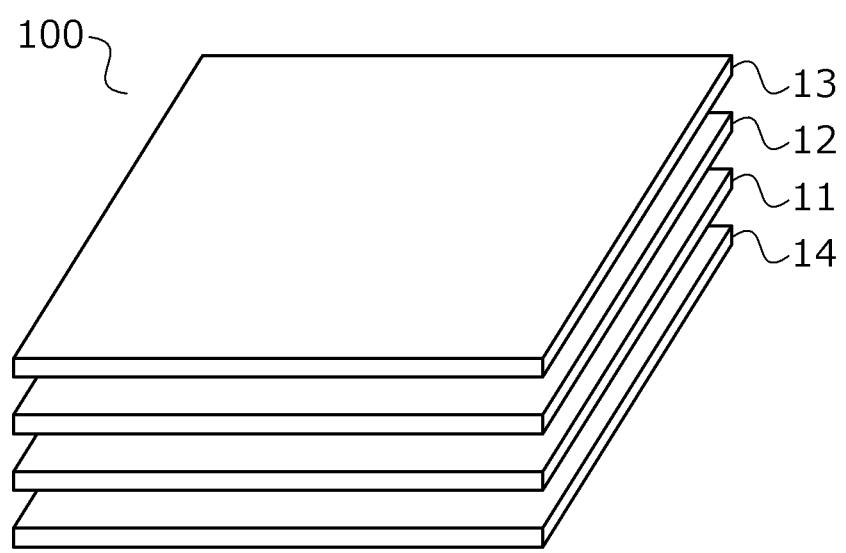
FIG. 10 is a diagram depicting a configuration of a display apparatus using a double-layered liquid crystal panel.

An outline of a hardware configuration of a display apparatus using a double-layered liquid crystal panel, to which the present invention is applied, will be described with reference to FIG. 10.

The display apparatus 100 includes a backlight module 11, a rear panel (first panel) 12, a front panel (second panel) 13 and a control unit 14. In the following description, the direction from the backlight module 11 to the display surface is assumed to be the forward direction. The rear panel 12 is a liquid crystal panel disposed on the front side (front surface side) of the backlight module 11, and the front panel 13 is a liquid crystal panel disposed on the front side of the rear panel 12. Each rear panel 12 and front panel 13 includes a plurality of pixels of which transmittance can be controlled, and the light irradiated from the backlight module 11 transmits through the rear panel 12, and then transmits through the front panel 13, whereby an image is displayed on the screen. The control unit 14 performs various processing and controls of the display apparatus 100. The position of the control unit 14 (a control circuit board on which the control unit 14 is disposed) is not especially limited, but the control unit 14 is behind (rear side) the backlight module 11 in FIG. 10. The display apparatus 100 also includes an external bezel, a power supply, an operation key, and a remote controller which are not illustrated. To prevent moire, an optical sheet, a predetermined space or the like may be disposed between the rear panel 12 and the front panel 13.

Problem of Double-layered Liquid Crystal Panel

Figure 8A:
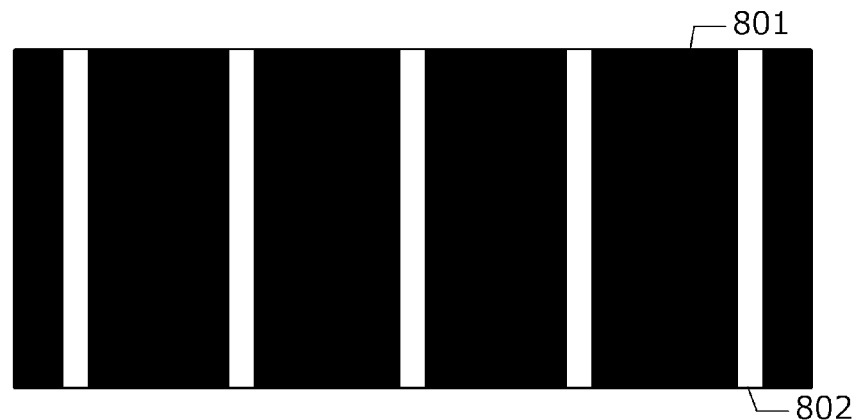
FIG. 8A to FIG. 8C are diagrams depicting a cause of generation of a double-contour interference.
Figure 8B:
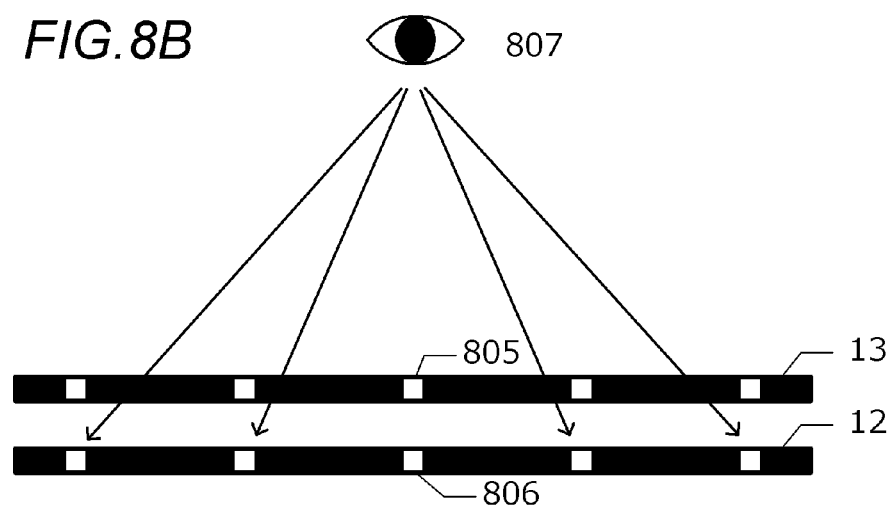
Figure 8C:
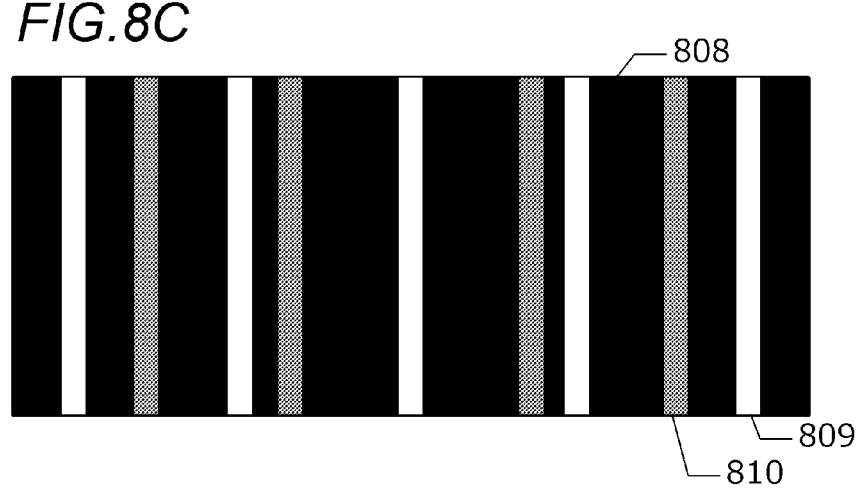

As mentioned above, in the case of a display apparatus using a double-layered liquid crystal panel, a double-contour interference may be generated in a portion where the high luminance region and the low luminance region are adjacent to each other. The cause of this phenomenon will be described with reference to FIG. 8A to FIG. 8C. FIG. 8A illustrates an example of an input image 801. The input image 801 is an image where a plurality of white lines 802 vertically exist against a black background. FIG. 8B illustrates the transmittance of a front panel 13 and a rear panel 12 respectively, a viewpoint 807 and a line-of-sight direction. To simplify description, FIG. 8B indicates the transmittance of one line in the horizontal direction located at the same height as the viewpoint 807, and black indicates pixels of which transmittance is 0%, and white indicates pixels of which transmittance is 100%. FIG. 8C schematically indicates a displayed image 808 observed from the viewpoint 807.

When the front panel 13 and the rear panel 12 are controlled based on the input image 801 in FIG. 8A, the transmittance of the pixels 805 and 806 located at positions corresponding to the white line 802 become 100%, as illustrated in FIG. 8B. In this case, the white line located directly in front of the viewpoint 807 (position at which the line-of-sight angle is virtually 0%) is observed as a high quality image (see FIG. 8C). However, in the case of pixels distant from the front of the viewpoint 807, the line-of-sight angle with respect to a pixel on the front panel 13 and the line-of-sight angle with respect to a pixel on the rear panel 12, deviate from each other, and this deviation increases as the line-of-sight angle increases (as the location becomes more distant from the front of the viewpoint 807). Because of this, when the image is viewed from the viewpoint 807, the high luminance (high transmittance) pixels on the rear panel 12 may be visually recognized through the low luminance (low transmittance) pixels on the front panel 13. This is the cause of generation of double-contour interference. The displayed image 808 in FIG. 8C is an example when the double-contour interference 810 is visually recognized along with the white lines 809 of the original image.

Figure 9A:
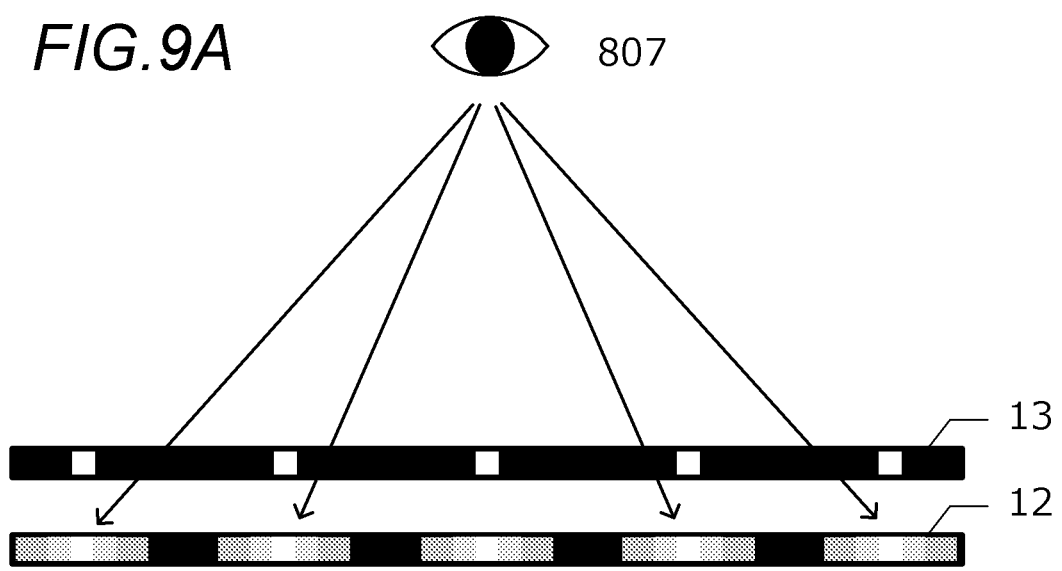
FIG. 9A to FIG. 9C are diagrams depicting a cause of generation of a halo interference.
Figure 9B:
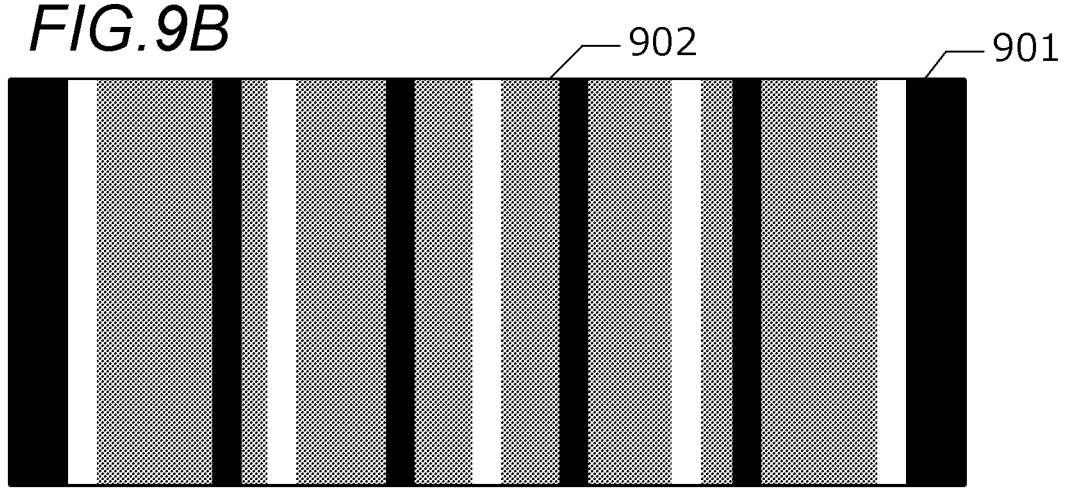

To reduce such a double-contour interference, the present inventors tried to apply a spatial low-pass filter to data used for driving the rear panel 12, yet faced another problem of halo interference. This will be described with reference to FIG. 9A to FIG. 9C. When a low-pass filter is applied to the input image 801 (FIG. 8A), an image, in which the white lines become wider and the contours thereof blur, is acquired. If the rear panel 12 is driven using this image, the light transmits through a region wider than the original white line in the rear panel 12, as illustrated in FIG. 9A. In the view of this image from the viewpoint 807, a displayed image 901 is observed, as illustrated in FIG. 9B. In the displayed image 901, a double-contour is not generated, instead a halo (a hazy bright region) appears around each white line. This halo interference drops contrast and sharpness, and in some cases the user senses a drop in image quality. For example, in the case of an image where small high luminance regions exist against a dark background, such as a starry sky and night view, the area around each high luminance region tends to become a hazy luminance, by which the user experiences visual irritation.

Figure 9C:

However, if the kernel size (reference range) of the low-pass filter is decreased, or if a degree of smoothing is decreased to reduce the halo interference, then the double-contour interference 904 may not be sufficiently suppressed, as illustrated in the displayed image 903 in FIG. 9C.

With the foregoing in view, the present inventors succeeded in suppressing both the double-contour interference and the halo interference with good balance in an image viewed by the observer, by adaptively changing the smoothing processing to be applied, depending on the position of the pixel on the rear panel 12. A concrete configuration and method thereof will be described later.

Each of the rear panel 12 and the front panel 13 is not limited to the liquid crystal panel, but may be a transmissive panel (transmissive type display panel) having a plurality of pixels (display elements) which can control transmittance. For example, at least one of the rear panel 12 and the front panel 13 may be a micro-electro-mechanical system (MEMS) shutter type display panel, which includes an MEMS shutter as the display element. In the case of the display apparatuses having a double-panel structure, other than liquid crystal panels, the above-mentioned double-contour interference and halo interference are generated, therefore the present invention may be applied to these apparatuses as well.

Embodiment 1

Figure 1:
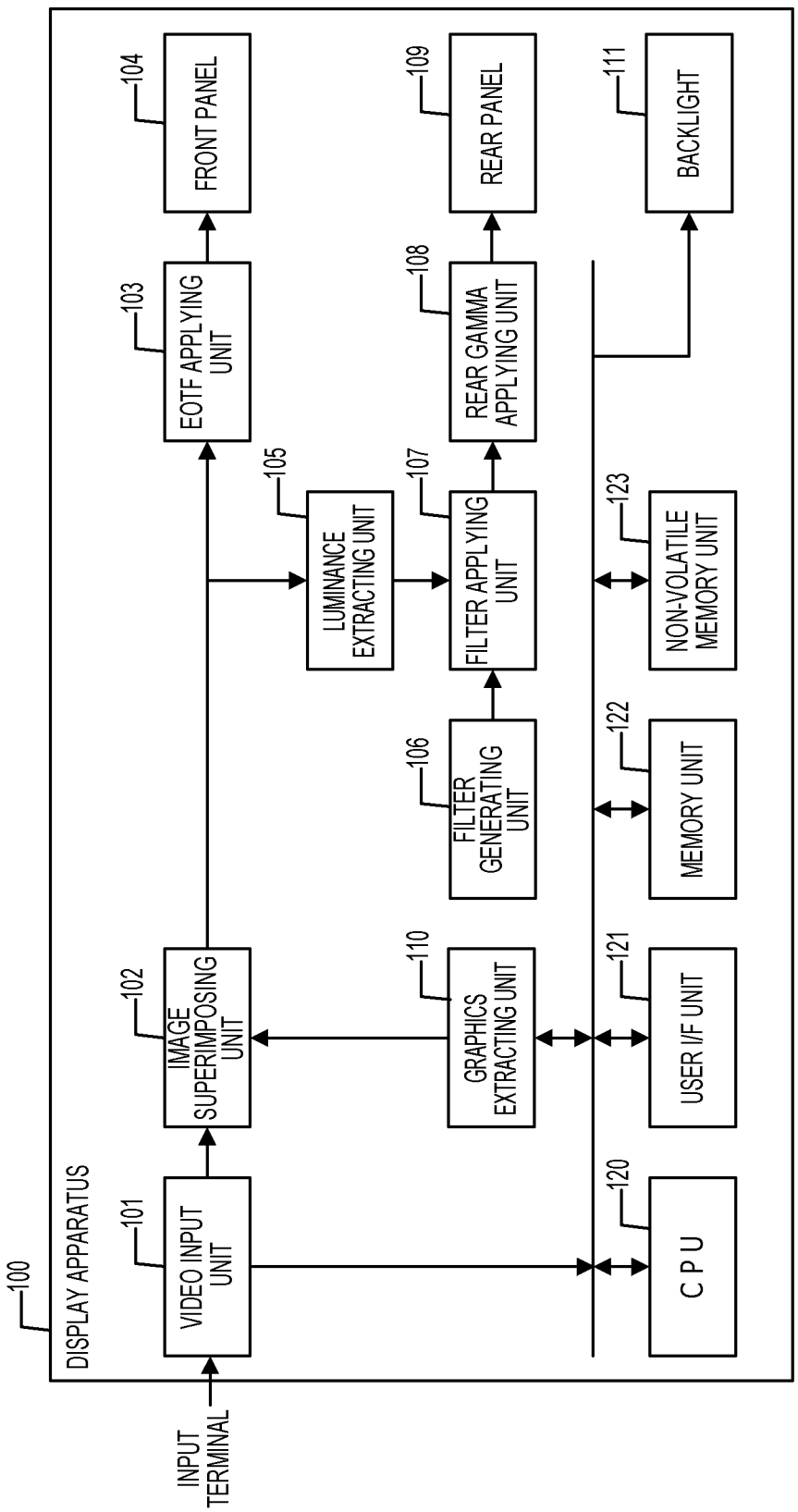
FIG. 1 is a block diagram depicting a display apparatus according to Embodiment 1.

FIG. 1 is a block diagram schematically depicting the internal configuration of the display apparatus according to Embodiment 1 of the present invention.

The display apparatus 100 includes a video input unit 101, an image superimposing unit 102, an EOTF applying unit 103, a front panel 104, a luminance extracting unit 105, a filter generating unit 106, a filter applying unit 107, a rear gamma applying unit 108, a rear panel 109, and a graphics generating unit 110. The display apparatus 100 also includes a backlight module 111 which is a light-emitting unit. Further, the display apparatus 100 includes a CPU (processor) 120, a user OF unit 121, a memory unit 122 and a non-volatile memory unit 123. In this configuration, the blocks excluding the front panel 104, the rear panel 109 and the backlight module 111 (that is, 101 to 103, 105 to 108, 110, and 120 to 123) are included in a control unit (reference number 14 in FIG. 10).

The video signal output from a video output apparatus (not illustrated) is input to the video input unit 101 through an input terminal via a signal line. The video input unit 101 separates the input video signal into header data and video data, outputs the header data to the CPU 120, demodulates the video data, and outputs the modulated video data to the image superimposing unit 102. Demodulation refers to re-arranging the video signals, which are arranged for transmission to be video signals for display.

The image superimposing unit 102 superimposes a graphics image, which is output from the graphics generating unit 110, onto the video data, which is output from the video input unit 101, and outputs the superimposed video data to the EOTF applying unit 103 and the luminance extracting unit 105.

The EOTF applying unit 103 multiplies the video data, output from the image superimposing unit 102, by an electrical optical transfer function (EOTF). EOTF has a function to indicate how to convert an electric signal into an optical signal. Well known examples of EOTF are hybrid log-gamma (hereafter HLF) standardized in the BT. 2100 recommendation by the Radiocommunication Sector of the International Telecommunication Unit (ITU-R), and perceptual quantization (hereafter PQ). The video data converted by EOTF is output to the front panel 104. The EOTF used by the EOTF applying unit 103 is not limited to the above examples.

The rear panel 109 transmits through the light of the backlight module 111 based on the luminance distribution data of the video signal, as mentioned later. The EOTF applying unit 103 may determine the EOTF to be applied to the video signal based on the quantity of light that transmits through the rear panel 109, so that the relationship between the luminance of the image displayed on the screen of the front panel 104 and the input video signal satisfies a predetermined relationship of the EOTF.

The front panel 104 controls the transmittance of liquid crystals in accordance with the video data output from the EOTF applying unit 103. The video data output from the EOTF applying unit 103 is data for controlling the transmittance of the front panel 104, hence the video data is also called control image data or driving image data of the front panel 104.

The luminance extracting unit 105 generates luminance distribution data by extracting luminance information of each pixel from the video data output from the image superimposing unit 102. When the video data is constituted of three pixel values (red, blue and green), it is preferable that the luminance extracting unit 105 extracts the highest pixel value out of the three elements (red, blue and green) as the luminance information of this pixel. For example, when the luminance information of one pixel is represented by 8 bits, the luminance distribution data is 256 levels of gray scale image data, which has the same number of pixels as the video data. The generated luminance distribution data is output to the filter applying unit 107.

The filter generating unit 106 generates a plurality of low-pass filters that are applied by the filter applying unit 107. The filter generating unit 106 may use a low-pass filter that is held in the non-volatile memory unit 123 in advance, or may dynamically calculate a low-pass filter in accordance with the input video and the line-of-sight position of the user (observer). The generated low-pass filter is output to the filter applying unit 107.

The filter applying unit 107 applies the low-pass filter output from the filter generating unit 106 to the luminance distribution data output from the luminance extracting unit 105. To apply the low-pass filter, the low-pass filter to be applied to each pixel is changed in accordance with the region of the luminance distribution data (position on the screen). The luminance distribution data to which the low-pass filter is applied is output to the rear gamma applying unit 108. The low-pass filter to be used here may be any filter that has a function to spatially smooth or blur the luminance distribution data (image data). The low-pass filter may be a true-space filter or a frequency space filter. Further, the low-pass filter may be a one-dimensional filter (e.g. horizontal filter, vertical filter) or a two-dimensional filter. In Embodiment 1, a low-pass filter (smoothing filter) that is used performs smoothing processing by converting the pixel value of a target pixel into a value in accordance with the statistic of the pixel values of the pixels included in a reference range (e.g. total value, mean value, weighted mean value).

The rear gamma applying unit 108 multiplies the luminance distribution data, which is output from the filter applying unit 107, by a gamma coefficient. The gamma coefficient is a coefficient to convert the luminance information of each pixel in the luminance distribution data into the transmittance of the liquid crystal. Normally the gamma coefficient is set to satisfy the conversion expression $Y=X^\gamma$ ($\gamma<1$). The converted luminance distribution data is output to the rear panel 109.

The rear panel 109 controls each pixel (liquid crystal element) in accordance with the luminance distribution data output from the rear gamma applying unit 108, and adjusts the transmission of the light emitted from the backlight module 111. The luminance distribution data output from the rear gamma applying unit 108 is data to control the transmittance of the rear panel 109, hence this luminance distribution data is also called the control image data or the driving image data of the rear panel 109.

The graphics generating unit 110 generates an image for the on screen display (OSD) related to the video and the apparatus according to the instructions from the CPU 120. The generated graphics image is output to the image superimposing unit 102. The CPU 120 instructs each unit to execute a series of processing.

The CPU 120 develops a program, stored in the non-volatile memory unit 123, in the memory unit 122, and executes the program so as to execute various processing and provide various functions.

The user I/F unit 121 acquires the operation information from the user. The operation information from the user includes information on depressing the buttons and pressing the touch panel installed in the display apparatus 100, and information on depressing the buttons via a remote control which is connected by cable or wirelessly. The CPU 120 acquires the set values and target values input by the user via the operation information from the user and the OSD generated by the graphics generating unit 110.

The memory unit 122 is a storage medium that can hold information only when power is ON. The non-volatile memory unit 123 is a storage medium that can hold information even when power is OFF.

In the display apparatus 100 of Embodiment 1, the video input unit 101, the image superimposing unit 102, the EOTF applying unit 103, the luminance extracting unit 105, the filter applying unit 107, the rear gamma applying unit 108, and the graphics generating unit 110 are configured on a dedicated circuit (e.g. ASIC) respectively. However, a part or all of these functions may be implemented by programs executed by the CPU 120.

Filter Applying Processing

A basic flow of the filter applying processing by the filter applying unit 107 according to Embodiment 1 will be described next, with reference to FIG. 2. The filter applying unit 107 of Embodiment 1 performs processing to divide the rear panel 109 into two types of regions: a first region and a second region, and differentiate a low-pass filter to be applied to the pixels in the first region from a low-pass filter to be applied to the pixels in the second region. In other words, the filter applying unit 107 performs processing to differentiate the strength of the smoothing processing that is applied to the first region from the strength of smoothing processing that is applied to the second region. Specific examples of the first region and the second region will be described later.

When the luminance distribution data is input from the luminance extracting unit 105, the filter applying unit 107 starts the processing in FIG. 2. The steps S201 and S205 are the loop limits, and the processing in steps S202 to S204 are repeatedly executed for all the pixels of the luminance distribution data. In the following description, a processing target pixel is called "pixel n". In step S202, the filter applying unit 107 determines whether the pixel n is included in the first region on the rear panel. Processing advances to step S203 if the pixel n is a pixel in the first region, or to step S204 if the pixel n is a pixel in the second region. In step S203, the filter applying unit 107 applies a first low-pass filter F1 to the pixel n, and processing advances to step S205. In step S204, on the other hand, the filter applying unit 107 applies a second low-pass filter F2 to the pixel n, and processing advances to step S205. The first low-pass filter F1 has a smaller reference range (kernel size) or smaller degree of smoothing compared with the second low-pass filter F2. In other words, the strength of the smoothing of the first low-pass filter F1 is lower than that of the second low-pass filter F2. Specific examples of the filters F1 and F2 will be described later. In step S205, processing ends if the filter application to all the pixels on the luminance distribution data completed. If not, processing returns to step S201.

An example of the first and second regions and the filters F1 and F2 will be described with reference to FIG. 3A and FIG. 3B. In this example, it is assumed that the center region of the screen is a region corresponding to the effective field of view of the observer, and the center region of the screen is set to the first region, and the edge region of the screen is set to the second region.

Figure 3A:
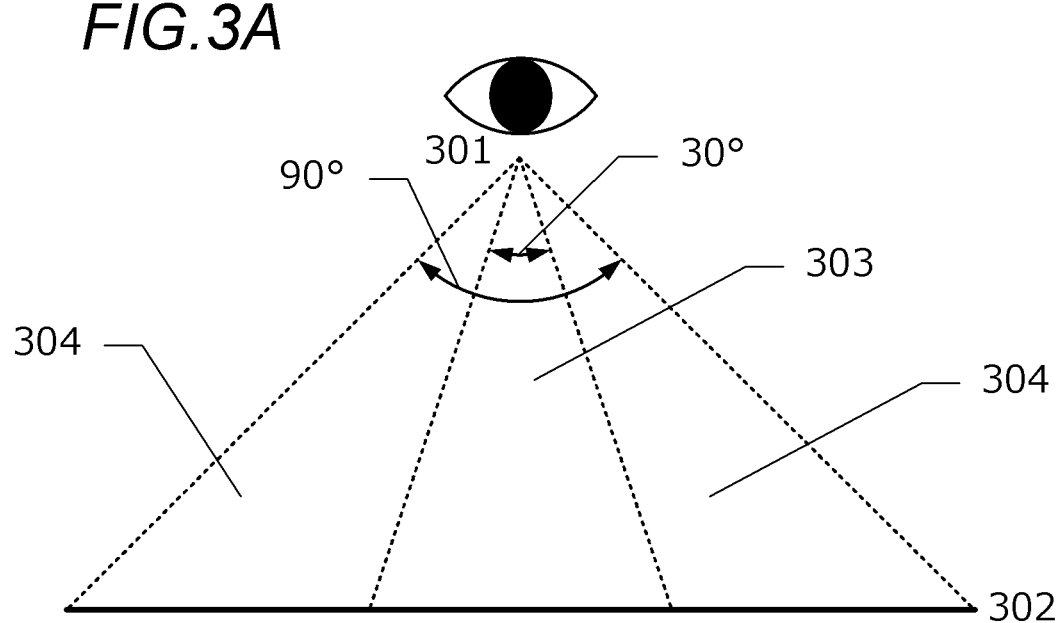
FIG. 3A and FIG. 3B are diagrams depicting an example of a first region, a second region and a filter according to Example 1.
Figure 3B:
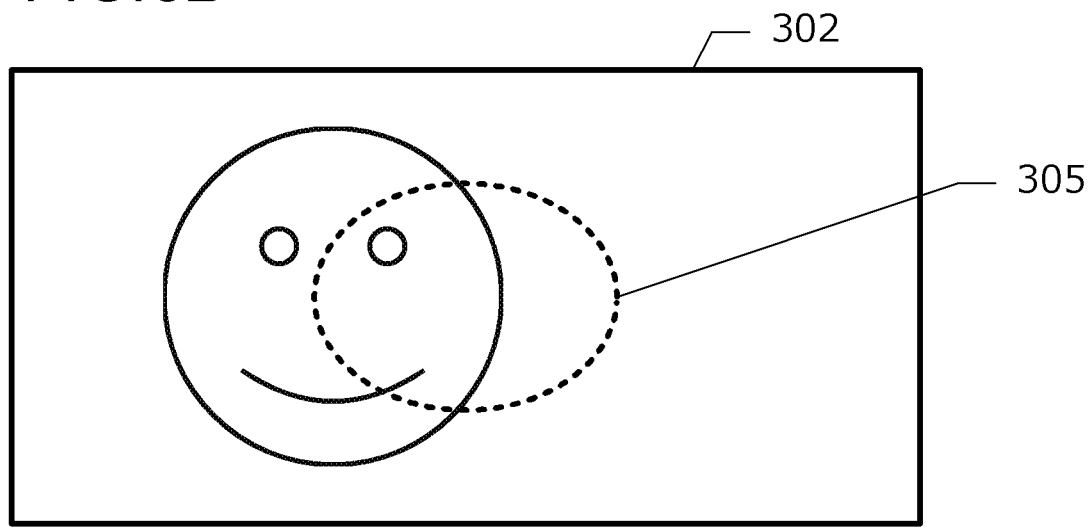

FIG. 3A is a diagram depicting an effective field of a human view and the stable field of fixation in the horizontal direction, and FIG. 3B is a diagram depicting a relationship between the screen of the display apparatus and the effective field of view. The effective field of view is a visual field range in which the information receiving capability is high, and is regarded as a range of 30° in the horizontal direction, and 20° in the vertical direction. A stable field of fixation is a range where a fixation point can be stably and quickly moved, and is regarded as a maximum of 90° in the horizontal direction, and a maximum of 70° in the vertical direction. In the horizontal direction, the effective field of view, when the screen 302 is observed from the viewpoint 301, is a range indicated by the reference number 303. In the same manner, in the horizontal direction, the stable field of fixation, when the screen 302 is observed from the viewpoint 301, is the total range of the range indicated by the reference number 303, and the range indicated by the reference number 304. Normally when a display is observed, the user attempts to maintain the entire screen to be within the stable field of fixation 304, hence in many cases, the effective field of view of the user remains in the range indicated by the reference number 305 on the screen 302. In the effective field of view, where the line-of-sight angle (angle formed by the vertical line onto the screen and the line of sight) is sufficient small, the double-contour interference is not visually recognized very much. On the other hand, the observer is sensitive to a drop in image quality caused by a halo and the like in the effective field of view. In other words, in the region around the center of the screen, the observer is less likely to visually recognize the double-contour interference, and is more sensitive to a drop in image quality caused by a halo and the like, compared with the edges of the screen.

Therefore, the filter F1, of which kernel size or degree of smoothing is small, is used for the pixels in the center region (first region) of the screen, and the filter F2, of which kernel size or degree of smoothing is large, is used for the pixels in the edge region (second region) of the screen. Thereby the user can view an image having less double-contour interference and halo interference in the effective field of view, and can view an image having less double-contour interference in a region outside the effective field of view.

FIG. 6A to FIG. 6C indicate an example in the case where a low-pass filter to be applied is differentiated between the region corresponding to the effective field of view in the horizontal and vertical directions and the other region. When input image data 600 indicated in FIG. 6A is received, the luminance extracting unit 105 generates luminance distribution data 601. Then the filter applying unit 107 applies the filter F1 to the pixels in an effective field of view region 602 in the luminance distribution data 601, and applies the filter F2 to the pixels in the other region, whereby the filtered luminance distribution data 604 is acquired.

FIG. 6B and FIG. 6C are examples of the low-pass filters F1 and F2. Each of the low-pass filters converts (replaces) the pixel value of a target pixel (pixel located at the center of the filter) to (with) a value determined by totaling values obtained by multiplying the pixel values of pixels included in the reference range by coefficients. Therefore, the degree of smoothing decreases as the reference range (kernel size) is smaller. Further, (even if the reference size is the same), the degree of smoothing lessens as the coefficient, by which the pixel value of the target pixel is multiplied, is larger than the coefficient by which the pixel values of the other pixels are multiplied.

FIG. 6B is an example when the kernel size is differentiated between the filter F1 and the filter F2; the filter F1 is a 3×3 filter, and the filter F2 is a 9×9 filter. FIG. 6C is an example when the degree of smoothing is differentiated between the filter F1 and the filter F2, and the filter coefficients are designed such that the degree of smoothing of the filter F1 is less than that of the filter F2. The filter coefficients in FIG. 6B and FIG. 6C are integers to simplify description, but with actual filters, the values of the filter coefficients are adjusted so that the total value of the filter coefficients becomes a same value (e.g. 1) between the filter F1 and the filter F2. The filters in FIG. 6B and FIG. 6C are merely examples, and the kernel size and the filter coefficients are not limited to these examples. Both the kernel size and the degree of smoothing (filter coefficient) may be differentiated between the filter F1 and the filter F2. By using such filters as F1 and F2, the blur of the image in the effective field of view region 602 lessens, and the blur of the image in the other region increases in the filtered luminance distribution data 604.

By controlling the transmittance of the front panel 104 based on the input image data 600 and controlling the transmittance of the rear panel 109 based on the filtered luminance distribution data 604, a displayed image 605, in which the double-contour interference is suppressed and the halo interference in the effective field of view is minimized, can be acquired.

As mentioned above, if a different filter processing is applied to each region of the screen, depending on the positional relationship between the observer and the screen, it can be appropriately selected whether priority can be assigned to: not recognize the double contour very much, or not recognize a drop in the image quality very much, depending on the positional relationship between the observer and the screen.

In the above example, the filter to be applied to the luminance distribution data is differentiated between the region around the center and the other region in the horizontal direction and the vertical direction of the screen, but the method of selecting regions to which different filters are applied is not limited to this. Modifications of Embodiment 1 will be described below.

Modification 1

Modification 1 is a case where the filter to be applied to the luminance distribution data is differentiated between the center region and the edge region in the horizontal direction of the screen, giving attention to the line-of-sight angle in the horizontal direction of the screen. To simplify description, it is assumed that both filters to be applied are filters that smooth the luminance distribution data in the horizontal direction.

Figure 4A:
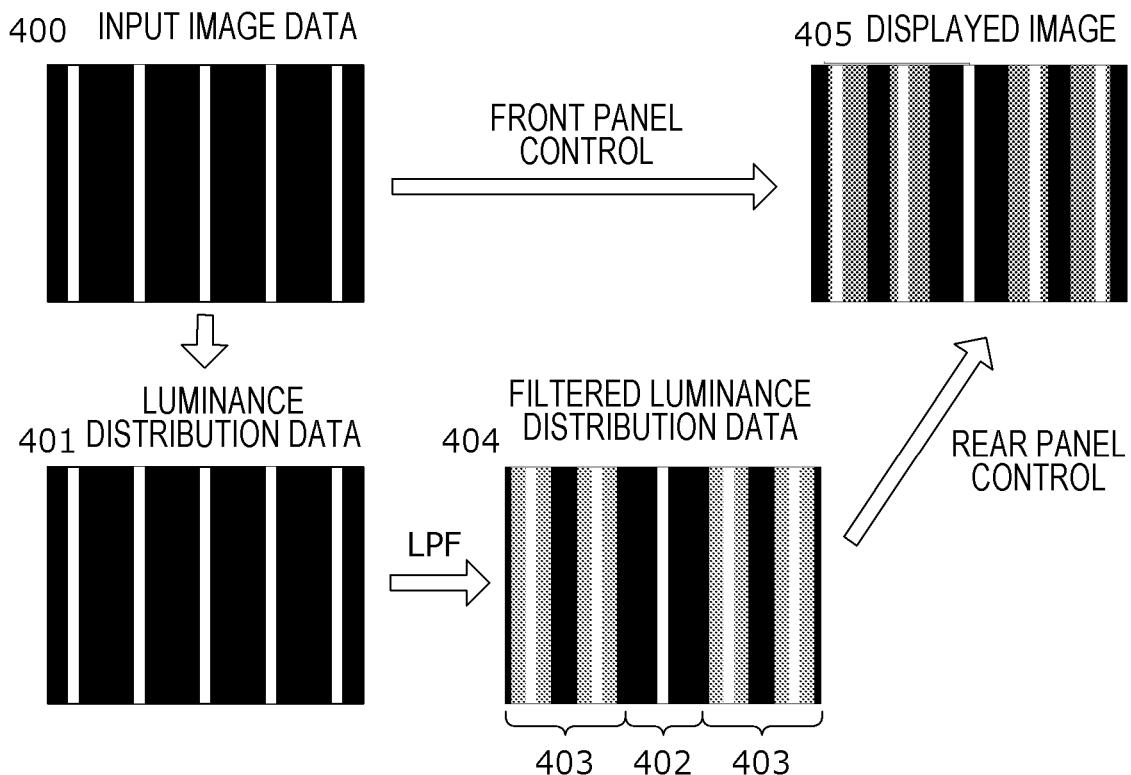
FIG. 4A to FIG. 4C are diagrams depicting an example of the filter applying processing according to Embodiment 1.
Figure 4B:
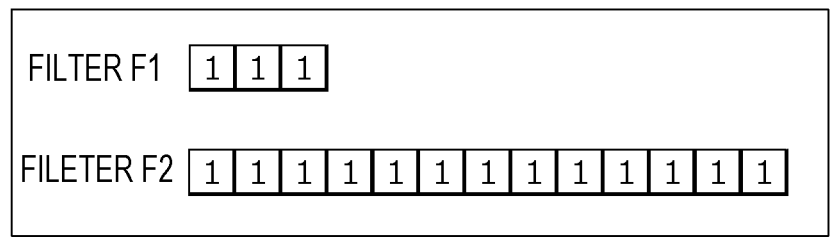
Figure 4C:
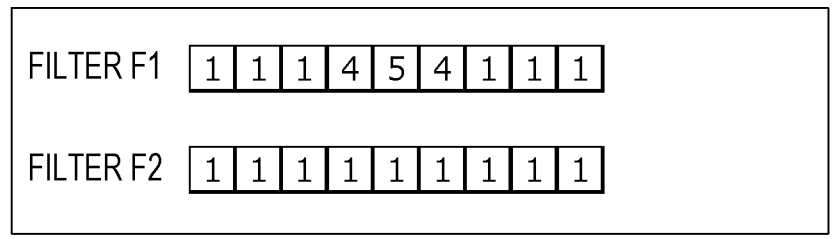

FIG. 4A to FIG. 4C indicate an example in the case where a low-pass filter to be applied is differentiated between a region corresponding to the effective field of view in the horizontal direction and in the other region. When input image data 400 indicated in FIG. 4A is received, the luminance extracting unit 105 generates luminance distribution data 401. Then the filter applying unit 107 applies the filter F1 to the pixels in the effective field of view region 402 in the horizontal direction of the luminance distribution data 401, and applies the filter F2 to the pixels in the other region 403, whereby the filtered luminance distribution data 404 is acquired.

FIG. 4B is an example when the kernel size is differentiated between the filter F1 and the filter F2; the filter F1 is a 3×1 filter and the filter F2 is a 13×1 filter. FIG. 4C is an example when the degree of smoothing is differentiated between the filter F1 and the filter F2, and the filter coefficients are designed such that the degree of smoothing of the filter F1 is less than that of the filter F2. The filter coefficients in FIG. 4B and FIG. 4C are integers to simplify description, but with actual filters, the values of the filter coefficients are adjusted so that the total value of the filter coefficients becomes a same value (e.g. 1) between the filter F1 and the filter F2. The filters in FIG. 4B and FIG. 4C are merely examples, and the kernel sizes and the filter coefficients are not limited to these examples. Both the kernel size and the degree of smoothing (filter coefficient) may be differentiated between the filter F1 and the filter F2. By using such filters as F1 and F2, the blur of the image in the effective field of view region 402 lessens, and the blur in the image in the other region 403 increases in the filtered luminance distribution data 404.

By controlling the transmittance of the front panel 104 based on the input image data 400 and controlling the transmittance of the rear panel 109 based on the filtered luminance distribution data 404, a displayed image 405, in which the double-contour interference is suppressed and the hallow interference in the effective field of view is minimized, can be acquired.

Modification 2

Modification 2 is a case where the filter to be applied to the luminance distribution data is differentiated between the center region and the edge region in the vertical direction of the screen, giving attention to the line-of-sight angle in the vertical direction of the screen. To simplify description, it is assumed that both filters to be applied are filters to smooth the luminance distribution data in the vertical direction.

Figure 5A:
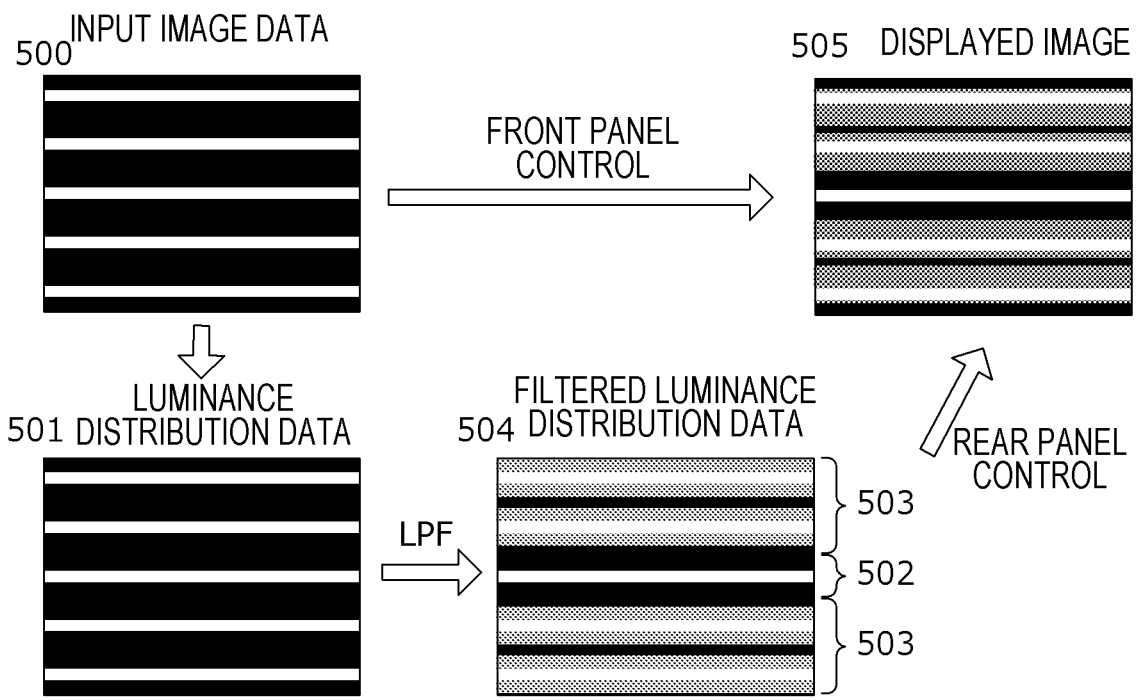
FIG. 5A to FIG. 5C are diagrams depicting a modification of the filter applying processing according to Embodiment 1.
Figure 5B:
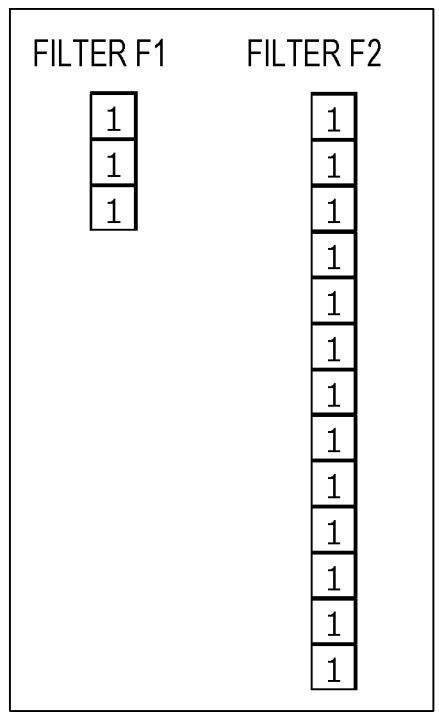
Figure 5C:
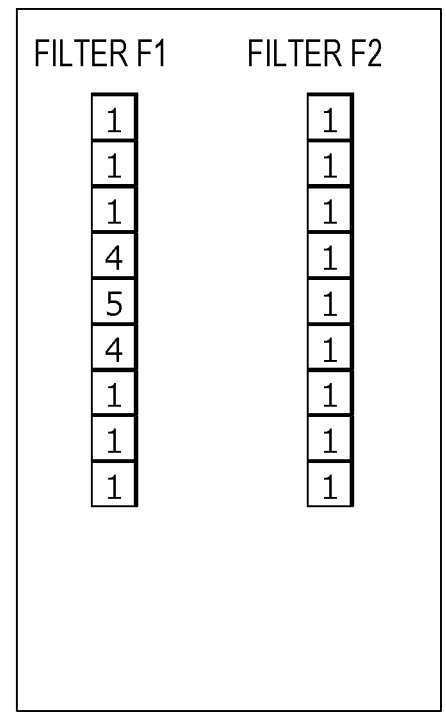

FIG. 5A to FIG. 5C indicate an example in the case where a low-pass filter to be applied is differentiated between a region corresponding to the effective field of view in the vertical direction and the other region. When input image data 500 indicated in FIG. 5A is received, the luminance extracting unit 105 generates luminance distribution data 501. Then the filter applying unit 107 applies the filter F1 to the pixels in the effective field of view region 502 in the vertical direction in the luminance distribution data 501, and applies the filter F2 to the pixels in the other region 503, whereby the filtered luminance distribution data 504 is acquired.

FIG. 5B is an example when the kernel size is differentiated between the filter F1 and the filter F2; the filter F1 is a 1×3 filter and the filter F2 is a 1×13 filter. FIG. 5C is an example when the degree of smoothing is differentiated between the filter F1 and the filter F2, and the filter coefficients are designed such that the degree of smoothing of the filter F1 is less than that of the filter F2. The filter coefficients in FIG. 5B and FIG. 5C are integers to simplify description, but with actual filters, the values of the filter coefficients are adjusted so that the total value of the filter coefficients becomes a same value (e.g. 1) between the filter F1 and the filter F2. The filters in FIG. 5B and FIG. 5C are merely examples, and the kernel sizes and the filter coefficients are not limited to these examples. Both the kernel size and the degree of smoothing (filter coefficient) may be differentiated between the filter F1 and the filter F2. By using such filters as F1 and F2, the blur of the image in the effective field of view region 502 lessens, and the blur of the image in the other region 503 increases in the filtered luminance distribution data 504.

By controlling the transmittance of the front panel 104 based on the input image data 500 and controlling the transmittance of the rear panel 109 based on the filtered luminance distribution data 504, a displayed image 505, in which the double-contour interference is suppressed and halo interference in the effective field of view is minimized, can be acquired.

Modification 3

Filter applying processing according to Modification 3 will be described with reference to FIG. 7. In this modification, a filter F2, of which the kernel size or the degree of smoothing is large, is applied to a region of interest in the screen; and a filter F1, of which the kernel size or the degree of smoothing is small, is used for the other region. Thereby the generation of double-contour interference in a region of interest is prevented with certainty. The region of interest refers to a region in the screen which the observer pays attention to (or to which the observer is likely to pay attention to). In this example, a graphics image superimposed on the displayed image (e.g. on screen display (OSD) image) will be described as an example of an image in a region of interest.

Figure 7:
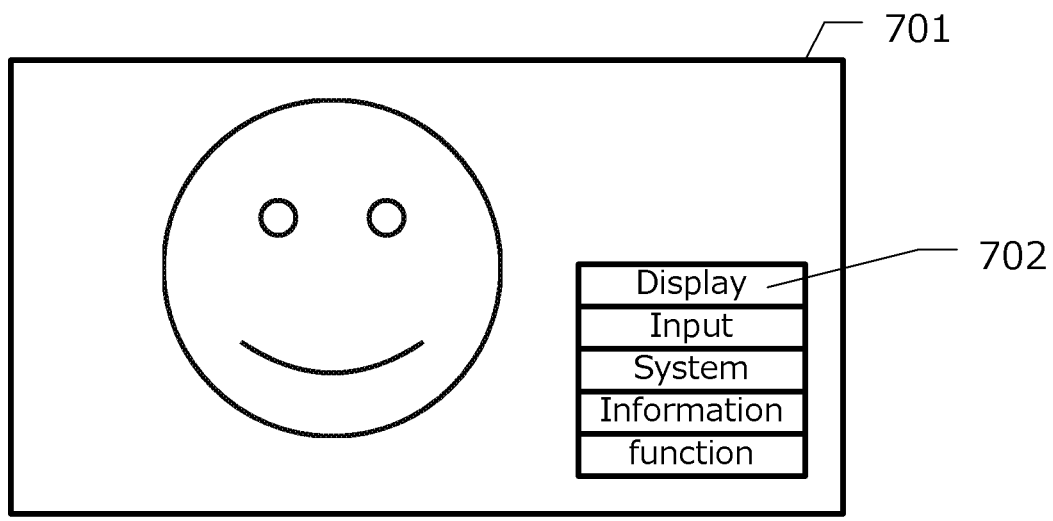
FIG. 7 is a diagram depicting a modification of the filter applying processing according to Embodiment 1.

FIG. 7 is an example of a displayed image in which an OSD 702 is superimposed on the input image data 701. When the OSD 702 is displayed on the screen, it is quite likely that the observer pays attention to the OSD 702. Therefore, it is preferable to not generate the double-contour interference, which may cause a strong sense of interference, in the region of the OSD 702. Further, the OSD 702, which is a menu display or information display, often includes characters and line drawings. Therefore, if a double-contour interference is generated, the observer may have difficulty in recognizing the characters and line drawings, and misunderstand the display content of the OSD 702.

Therefore, in Modification 3, the region of interest where the OSD 702 is superimposed is set to the second region, and the other region is set to the first region. Then the filter F2, of which the kernel size or the degree of smoothing is large is applied to the region of the OSD 702, and the generation of the double-contour interference is the region of OSD 702, can be suppressed. As a result, the observer can accurately read the information on the OSD 702. On the other hand, the filter F1, of which the kernel size or the degree of smoothing is small, is applied to a region other than the OSD 702 (first region). Thereby an undesired halo can be suppressed, and good image quality can be observed.

In FIG. 7, the OSD 702 is a menu, but this is an example, and a similar effect can be acquired even when the OSD 702 is information of image signals, such as a graphics display, a vector scope of an image signal, a waveform monitor and a histogram. Further, the image in the region of interest is not limited to OSD. For example, a high luminance region or a region, of which motion is larger in the input image, or a region where a specific object is included, may be selected as a region of interest. The observer may specify the region of interest instead of automatically detecting and setting the region of interest.

As described above, it is also possible to apply a different filter depending on whether the position in the horizontal direction on the screen is a region near the center or not, or to apply a different filter depending on whether the position in the vertical direction on the screen is a region near the center or not. Further, it is also possible to apply a different filter depending on whether the region is where an image, which is set in advance, is displayed or not.

The observer may select from the above-mentioned plurality of conditions to apply a filter. Then the observer can determine how to distinguish the regions of the image in accordance with an image to be displayed and an operation performed by the observer, and can select a preferable filter. This selection may be input by the observer (user) via the user I/F unit 121.

The operation modes on the filter application which the user can set may include not only the operation mode to differentiate the filter to be applied between the first region and the second region, but also an operation mode to apply the same filter for the entire surface of the luminance distribution data. An operation mode to not apply a filter may be included as an option.

The method of dividing the region is not limited to dividing the region into two (center region and edge region). Different filters may be applied to three or more regions respectively. Further, by using the setting unit of the display apparatus, the user may set the position, size, shape and the like of the regions to which different filters are applied. For example, a marker to indicate a region is displayed on the screen, and the user may operate the marker via the user I/F unit 121, so as to set a plurality of regions to which mutually different filters are applied. Furthermore, the user may input a coordinate position in the image, so as to set a plurality of regions to which mutually different filters are applied.

Embodiment 2

Embodiment 2 of the present invention will be described next. A difference in Embodiment 2 from Embodiment 1 is the filter applying processing. In the following, primarily the difference from Embodiment 1 will be described, and description on the configurations and operations the same as Embodiment 1 will be omitted. A composing element the same as Embodiment 1 will be denoted with the same reference sign.

In Embodiment 2, a low-pass filter is applied to a first pixel in a first region using a pixel value of a pixel included in a reference range around the first pixel. And a low-pass filter is applied to a second pixel in a second region, which is located distant from the first pixel, using a pixel value of a pixel included in a reference range around a third pixel, which is located closer to the first pixel than to the second pixel. It is preferable to determine the third pixel such that a distance between the second pixel and the third pixel is longer as a distance between the first pixel and the second pixel is longer. By switching the reference range of the low-pass filter like this, good video images, in which the double-contour interference and the halo interference are minimized, can be observed when the screen is viewed from an observing position facing the first pixel.

"The first pixel" here is preferably a pixel corresponding to the fixation point of the observer, and, for example, a pixel at the center of the screen or a point in the region of interest (e.g. a point at the center of a graphics image in the OSD, a point on a menu in a selected state) is selected as the first pixel. The actual position of the fixation point of the observer (first pixel) may be calculated by measuring the position of the viewpoint of the observer. If the low-pass filter is applied using a pixel value of a pixel included in the reference range around the third pixel, which is located closer to the first pixel than to the second pixel, not only is the image smoothed (blurred), but the image around the third pixel can be parallel-shifted to the position of the second pixel as well.

Figure 11:
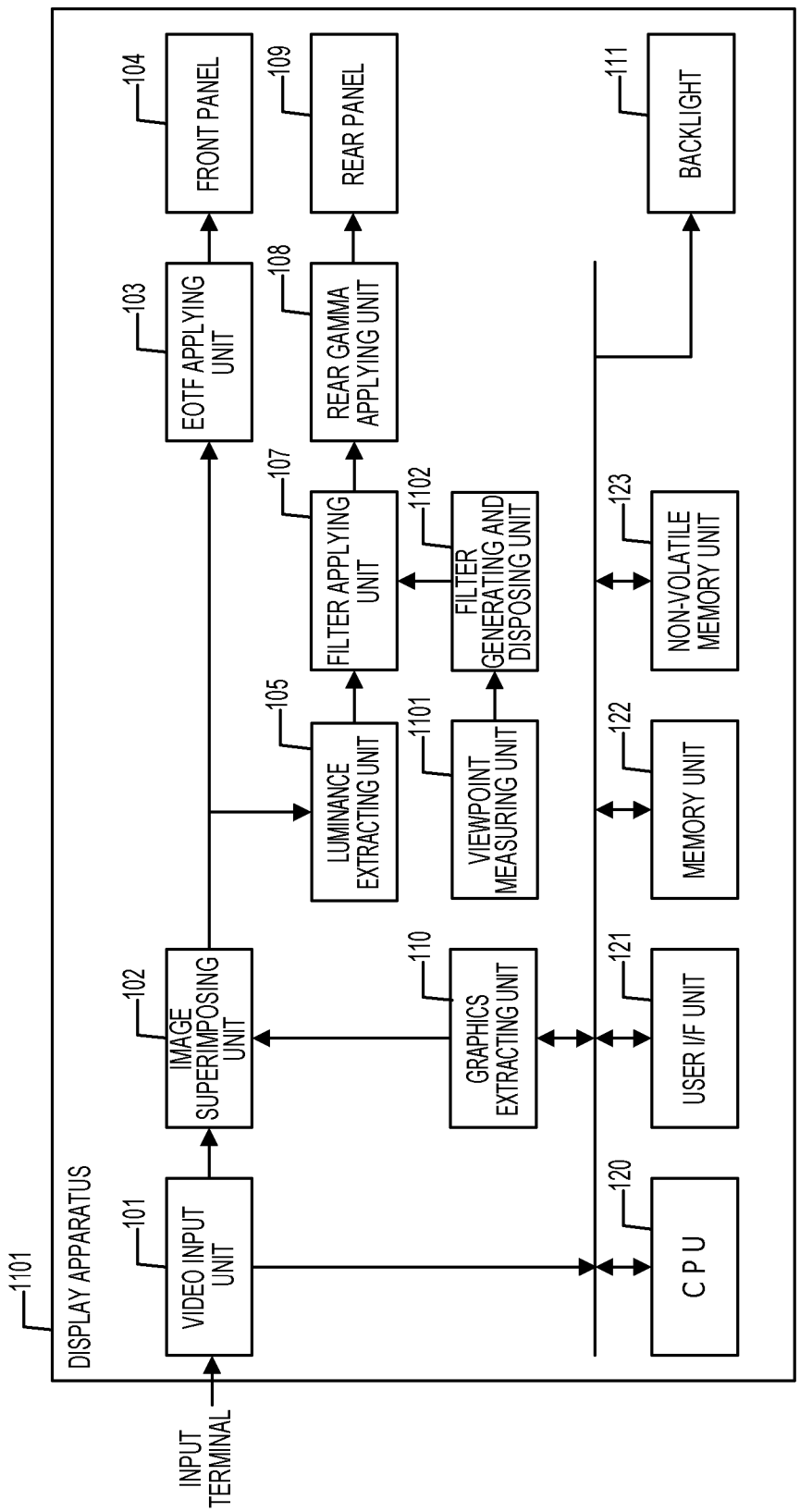
FIG. 11 is a block diagram depicting a display apparatus according to Embodiment 2.

FIG. 11 is a diagram depicting a configuration of a display apparatus 1100 of Embodiment 2. A difference from Embodiment 1 is that a viewpoint measuring unit 1101 and a filter generating and disposing unit 1102 are included. The viewpoint measuring unit 1101 measures a position of a viewpoint of the observer (specifically, a distance from the screen of the display apparatus 1100 and relative positions from the center of the screen in the horizontal direction and the vertical direction). The information on the measured observation distance and the relative positions in the horizontal direction and the vertical direction are output to the filter generating and disposing unit 1102. The filter generating and disposing unit 1102 calculates a coefficient of a low-pass filter at each pixel of the luminance distribution data based on the observation distance and the relative positions in the horizontal direction and the vertical direction, output from the viewpoint measuring unit 1101. The calculation method will be described later. The calculated coefficient of the low-pass filter at each pixel is output to the filter applying unit 107.

Figure 12A:
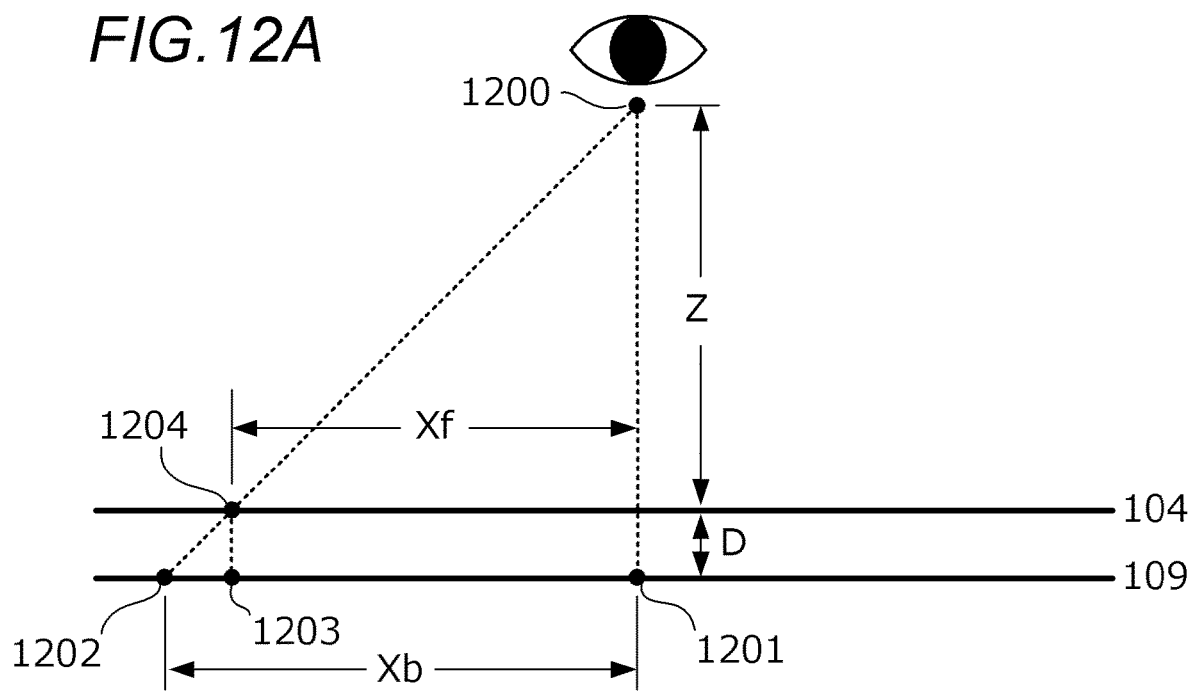
FIG. 12A and FIG. 12B are diagrams depicting an example of a filter according to Embodiment 2.
Figure 12B:
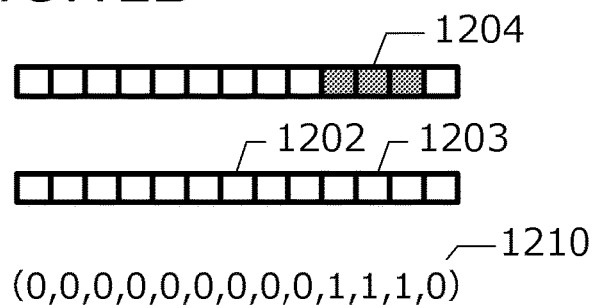

The method of determining the coefficient of the low-pass filter by the filter generating and disposing unit 1102 will be described next with reference to FIG. 12A and FIG. 12B. In FIG. 12A and FIG. 12B, only calculation for the horizontal direction will be described, but the same calculation is applicable for the vertical direction as well.

In FIG. 12A, the reference number 104 indicates the front panel, and the reference number 109 indicates the rear panel. Here Z denotes the observation distance between the viewpoint 1200 and the screen (surface of the front panel 104), and D denotes the distance between the front panel 104 and the rear panel 109. In this state, the above-mentioned first pixel is a pixel 1201 on the rear panel 109, which is located at the intersection between the vertical line from the viewpoint 1200 to the screen and the rear panel 109. In other words, the viewpoint 1200 exists at a position which is on a line passing through the first pixel and perpendicular to the screen and which is distant from the screen by the distance D.

Here the second pixel is a pixel 1202 on the rear panel 109, which is located distant from the viewpoint 1200 in the horizontal direction by the distance Xb, and the fourth pixel is a pixel 1204, which is located at the intersection between a line drawn from the viewpoint 1200 to the second pixel 1202 and the front panel 104. The third pixel is a pixel 1203 on the rear panel 109, which is located at the same position as the fourth pixel 1204. As illustrated in FIG. 12A, the distance Xf in the horizontal direction from the first pixel 1201 to the third pixel 1203 is given by the following expression.

$$Xf = Xb \times Z/(Z+D)$$

When this positional relationship is established, the second pixel 1202 on the rear panel 109 and the fourth pixel 1204 on the front panel 104 appear as if overlapping when the screen is viewed from the viewpoint 1200. Therefore, by controlling the transmittance of the second pixel 1202 on the rear panel 109 based on the luminance information or the fourth pixel 1204 on the front panel 104, the double-contour interference can be suppressed. Therefore, in Embodiment 2, a low-pass filter, referring to the pixel range around the third pixel 1203, is applied to the second pixel 1202 in the filter applying processing. By this filter processing, not only is the luminance distribution data smoothed, but an effect equivalent to applying the luminance information on the fourth pixel 1204 to the control of the second pixel 1202 can be obtained as well. The distance between the position of the second pixel 1202 (center of the filter) and the position of the third pixel 1203 (center of the reference range) is longer as the observation distance is closer.

FIG. 12B is an enlarged schematic diagram of the areas around the fourth pixel 1204 on the front panel 104, and the second pixel 1202 and the third pixel 1203 on the rear panel 109, along with an example of the filter coefficients of the low-pass filter 1210 to be applied to the second pixel 1202 expressed in a line. In this low-pass filter 1210, only the coefficients of the third pixel 1203, which is a pixel at a position corresponding to the fourth pixel 1204, and the pixels on both sides of the third pixel 1203 are set to 1. Thereby the pixels 1202 and 1204, which are viewed at the same position when viewed from the viewpoint 1200, are controlled using corresponding luminance information, and as a result, the generation of the double-contour interference and the halo interference can be minimized. The size and the coefficients of the filter in FIG. 12B are merely examples. A coefficient is not limited to 1, and the coefficients may be differentiated between the third pixel 1203 and the pixels on both sides of the third pixel 1203. The reference range may be more or less than three pixels.

According to Embodiment 2 described above, the generation of the double-contour interference and the halo interference can be further decreased than Embodiment 1. In Embodiment 2, the low-pass filter is changed depending on the pixel of the luminance distribution data, but the low-pass filter may be changed depending not on a pixel but on a region (pixel group). An advantage of the latter is that the processing required for computing filter coefficients can be reduced. In Embodiment 2, the filters in the horizontal direction are described as an example, but the filters in the vertical direction may be used, or the filters in both the horizontal direction and the vertical direction may be used. Further, in Embodiment 2, the viewpoint measuring unit 1101 measures the observation distance of the observer and the horizontal and the vertical positions of the viewpoint, but only the observation distance may be measured, making the horizontal and vertical positions of the viewpoint fixed values (e.g. center of the screen). Further, both the observation distance and the horizontal and the vertical positions may be fixed values without measuring the viewpoint position, or the observer may specify the observation distance and the horizontal and vertical positions using the user interface provided by the OSD and the like (in this case, the viewpoint measuring unit 1101 is unnecessary). Furthermore, in Embodiment 2, the relative positions from the viewpoint in the horizontal and the vertical directions are calculated as distances, but may be calculated using a number of pixels or equivalent values thereof.

Embodiment 3

Embodiment 3 of the present invention will be described next. A difference of Embodiment 3 from Embodiment 2 is the filter applying processing (particularly setting of the filter coefficients). In the following, primarily the difference from Embodiment 2 will be described, and description on the configurations and operations the same as Embodiment 2 will be omitted. A composing element the same as Embodiment 1 or 2 will be denoted with the same reference sign.

In Embodiment 3, as well as in Embodiment 2, a low-pass filter to be applied to the luminance distribution data is changed depending on the pixel. In Embodiment 2, however, the filter coefficient is changed according to the observation distance (distance between the viewpoint and the screen), while in Embodiment 3, a general filter coefficient is set so that the double-contour interference is not generated when the viewpoint is within a predetermined distance range. Thereby good images can be observed even if the observer changes the observation distance, as long as the observation distance is within the predetermined distance range. Another advantage is that the configuration can be simplified since the viewpoint position need not be measured, as in the case of Embodiment 2. The horizontal and the vertical positions of the viewpoint may be fixed values or may be measured like Embodiment 2. In Embodiment 3, the horizontal and the vertical positions of the viewpoint are fixed values (center of the screen), and the range of the observation distance is a range from the closest distance at which the observer can visually recognize the images to an infinite distance.

FIG. 13A is a diagram depicting the closest distance of the observation distance. FIG. 13A indicates only the horizontal direction to simplify description, but the vertical direction can be described in the same way. When viewed from the viewpoint 1301, the closest distance D is a minimum value of the observation distance at which the entire screen 1302 is included in the stable field of fixation. When the width of the screen 1302 in the horizontal direction is W, the closest distance D of the observation distance is half the width W of the screen in the horizontal direction, since the stable field of fixation is 90°, that is:

$$D=W/2.$$

Using this value of the distance D, the filter coefficient in each pixel, to prevent generation of the double-contour interference when observed at the closest distance D, can be calculated by the method described in Embodiment 2. In other words, the filter to be applied to the pixel n is designed so as to refer to the pixel range around a pixel on the rear panel (third pixel), which is located at the same position as a pixel on the front panel (fourth pixel) located at the intersection of the line drawn from the viewpoint to the pixel n (second pixel) and the front panel.

On the other hand, the case where the viewpoint is at an infinite distance is regarded as equivalent to the case where each pixel is viewed from the front. Therefore, deviation (parallax) of a pixel on the rear panel and a pixel on the front panel need not be considered, and the transmittance of the rear panel can be controlled based on the luminance information on the pixel at the same position on the front panel. In this case, a filter to be applied to the pixel n may be designed so as to refer to the pixel range around the pixel n (second pixel).

Then a filter which refers to a pixel range, including both the reference range of the filter for the closest distance and the reference range of the filter for the infinite distance, is generated. In other words, in Embodiment 3, a low-pass filter, which refers to a reference range including at least the second pixel and the third pixel, is applied to the second pixel. By designing the low-pass filter like this, the double-contour interference can be suppressed in a range from the closest distance to the infinite distance, in other words, regardless the observation distance. For example, if the filter coefficient 1303 for the closest distance and the filter coefficient 1304 for the infinite distance are determined, as indicated in FIG. 13B, the filter coefficients corresponding the distance from the closest distance to the infinite distance can be determined, as indicated by the reference number 1305.

According to the filter applying processing of Embodiment 3 described above, good images can be observed even if the observer changes the observation distance. In Embodiment 3, the horizontal and the vertical positions of the viewpoint are the center of the screen (fixed values), but the present invention is not limited to this. The horizontal and the vertical positions of the viewpoint may be positions other than the center of the screen, or the viewpoint position may be measured in the same manner as Embodiment 2. Further, the observer may specify the viewpoint position. In Embodiment 3, the range of the observation distance is from the distance, at which the entire screen is included in the stable field of fixation, to infinity, but the present invention is not limited to this. For example, the range of the observation distance may be a distance at which the entire screen is included in the stable field of fixation to a distance at which the entire screen is included in the effective field of view. By setting like this, the generation of the halo interference can be decreased. Furthermore, in Embodiment 3, the screen width W is directly used, but if the screen width W is directly used, the four corners of the screen become outside the stable field of fixation, since the human visual field is elliptical in shape. Therefore, a value that is larger than the actual screen width may be used for W. Then the halo interference can be further decreased.

OTHER

The present invention may be implemented by processing in which a program that implements at least one function of the above embodiments is supplied to a system or apparatus via a network or storage medium, and at least one processor of the computer of the system or the apparatus reads and executes the program. The present invention may also be implemented by a circuit (e.g. ASIC) which implements at least one function.

The present invention may be carried out in various modes without departing from the spirit or the major characteristics thereof. Therefore, all aspects of the above embodiments are merely examples, and the scope of the present invention is not limited to the configurations of the above-mentioned embodiments. For example, the display apparatus may have a plurality of operation modes, including an operation mode to apply a same low-pass filter to the entire luminance distribution data, and an operation mode to apply a different low-pass filter depending on the region or the pixel, as in the case of each embodiment described above. Then the mode setting unit of the display apparatus may set one of these plurality of operation modes, and perform control to appropriately switch the filter to be applied based on the selected operation mode. In this case, the user may set an operation mode using a remote control or an operation unit on the display apparatus, or an appropriate operation mode may be set automatically in accordance with the input image or the operation conditions (e.g. maximum luminance) of the display apparatus.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-042173, filed on Mar. 8, 2018, which is hereby incorporated by reference herein in its entirety.

What is claimed is:

1. A display apparatus comprising:
   a backlight;
   a first panel configured to transmit light irradiated from the backlight;
   a second panel configured to display an image on a screen by transmitting the light transmitted through the first panel; and
   a control unit configured to control a transmittance of the first panel based on a second image generated by applying smoothing to at least a part of a first image, wherein
   the control unit performs processing to:
   divide the screen into at least a first region, corresponding to a center of the screen, and a second region, different from the first region, and
   differentiate a strength of the smoothing applied to a first image region of the first image corresponding to the first region of the screen and a second image region of the first image corresponding to the second region of the screen, such that the strength of smoothing applied to the first image region of the first image is lower than the strength of smoothing applied to the second image region of the first image.

2. The display apparatus according to claim 1, wherein
   the smoothing is filter processing to convert a pixel value of a target pixel into a value in accordance with a statistic of pixel values of pixels included in a reference range, and
   a reference range to process pixels in the first region is smaller than a reference range to process pixels in the second region.

3. The display apparatus according to claim 1, wherein
the smoothing is filter processing to convert a pixel value of a target pixel into a value determined by totaling values obtained by multiplying pixel values of pixels included in a reference range by coefficients, and
a coefficient to process pixels in the first region is larger than a coefficient to process pixels in the second region.

4. The display apparatus according to claim 1, wherein
the smoothing is filter processing to convert a pixel value of a target pixel into a value in accordance with a statistic of pixel values of pixels included in a reference range, and
the control unit applies the smoothing to a first pixel in the first image region using pixel values of pixels included in a reference range around the first pixel, and applies the smoothing to a second pixel in the second image region, which is located distant from the first pixel, using pixel values of pixels included in a reference range around a third pixel, which is located closer to the first pixel than to the second pixel.

5. The display apparatus according to claim 4, wherein the control unit determines the third pixel such that a distance between the second pixel and the third pixel is longer as a distance between the first pixel and the second pixel is longer.

6. The display apparatus according to claim 4, wherein the first pixel is a pixel at the center of the screen.

7. The display apparatus according to claim 4, wherein the control unit applies a low-pass filter, which refers to a reference range including the second pixel and the third pixel, to the second pixel.

8. The display apparatus according to claim 4, wherein the third pixel is a pixel on the first panel, and is located at a same position as a pixel on the second panel, the pixel on the second panel being located at an intersection between the second panel and a line drawn to the second pixel from a point which is on a line passing through the first pixel and perpendicular to the screen and which is distant from the screen by a predetermined distance.

9. The display apparatus according to claim 1, further comprising a mode setting unit configured to set an operation mode from a plurality of operation modes including an operation mode to apply a same low-pass filter to the entire first image, and an operation mode to apply different low-pass filters to the first region and the second region, wherein
the control unit switches smoothing to be applied to the first image based on the operation mode that is set.

10. The display apparatus according to claim 1, wherein
a transmittance of the second panel is controlled based on video data to be input, and
the first image is an image expressing luminance distribution of the video data.

11. The display apparatus according to claim 1, wherein the control unit divides the screen into at least the first region and the second region based on a positional relationship between an observer and the screen.

12. The display apparatus according to claim 1, wherein the first region is the center of the screen corresponding to effective field of view of an observer.

13. The display apparatus according to claim 1, wherein the control unit performs processing to determine whether a processing target pixel is included in the first region or the second region, and wherein:
in a case that the processing target pixel is in the first region, the control unit performs processing to apply a first low-pass filter to the processing target pixel; and
in a case that the processing target pixel is in the second region, the control unit performs processing to apply a second low-pass filter to the processing target pixel.

14. The display apparatus according to claim 1, wherein the control unit applies a first low-pass filter and a second low-pass filter to the first region and the second region, respectively, with filter coefficients being designed such that a degree of smoothing of the first low-pass filter is smaller than a degree of smoothing of the second low-pass filter.

15. The display apparatus according to claim 1, wherein the control unit applies a first low-pass filter and a second low-pass filter to the first region and the second region, respectively, with kernel sizes being designed such that a degree of smoothing of the first low-pass filter is smaller than a degree of smoothing of the second low-pass filter.

16. A display apparatus comprising:
a backlight;
a first panel configured to transmit light irradiated from the backlight;
a second panel configured to display an image on a screen by transmitting the light transmitted through the first panel;
a setting unit configured to set a first region and a second region, different from the first region, of the screen in accordance with input by a user; and
a control unit configured to control a transmittance of the first panel based on a second image generated by applying smoothing to at least a part of a first image, wherein the control unit performs processing to differentiate a strength of the smoothing applied to a first image region of the first image corresponding to the first region and a second image region of the first image corresponding to the second region, such that the strength of smoothing applied to the first image region of the first image is lower than the strength of smoothing applied to the second image region of the first image.

17. The display apparatus according to claim 16, further comprising a mode setting unit configured to set an operation mode from a plurality of operation modes including an operation mode to apply a same low-pass filter to the entire first image, and an operation mode to apply different low-pass filters to the first image region and the second image region, wherein
the control unit switches smoothing to be applied to the first image based on the operation mode that is set.

18. A control method for a display apparatus which includes: a backlight; a first panel configured to transmit light irradiated from the backlight; and a second panel configured to display an image on a screen by transmitting the light transmitted through the first panel, the control method comprising:
a step of generating a second image by applying smoothing to at least a part of a first image; and
a step of controlling a transmittance of the first panel based on the second image, wherein the method further comprises:
a step of dividing the screen into at least a first region, corresponding to a center of the screen, and a second region, different from the first region, and
a step of differentiating a strength of the smoothing applied to a first image region of the first image corresponding to the first region and a second image region of the first image corresponding to the second region, such that, in the step of generating the second image, the strength of smoothing applied to the first image region of the first image is lower than the strength of smoothing applied to the second image region of the first image.

19. A control method for a display apparatus which includes: a backlight; a first panel configured to transmit light irradiated from the backlight; and a second panel configured to display an image on a screen by transmitting the light transmitted through the first panel, the control method comprising:
   a step of setting a first region and a second region, different from the first region, of the screen in accordance with input by a user;
   a step of generating a second image by applying smoothing to at least a part of a first image; and
   a step of controlling a transmittance of the first panel based on the second image, wherein
   the method further comprises a step of differentiating a strength of the smoothing applied to a first image region of the first image corresponding to the first region and a second image region of the first image corresponding to the second region, such that, in the step of generating the second image, the strength of smoothing applied to the first image region of the first image is lower than the strength of smoothing applied to the second image region of the first image.

20. A non-transitory computer readable medium storing a program,
   the program causing a processor of a display apparatus, which includes: a backlight; a first panel configured to transmit light irradiated from the backlight; and a second panel configured to display an image on a screen by transmitting the light transmitted through the first panel, to execute:
   a step of generating a second image by applying smoothing to at least a part of a first image; and
   a step of controlling a transmittance of the first panel based on the second image, wherein
   the method further comprises:
   a step of dividing the screen into at least a first region, corresponding to a center of the screen, and a second region, different from the first region, and
   a step of differentiating a strength of the smoothing applied to a first image region of the first image corresponding to the first region and a second image region of the first image corresponding to the second region, such that, in the step of generating the second image, the strength of smoothing applied to the first image region of the first image is lower than the strength of smoothing applied to the second image region of the first image.

21. A non-transitory computer readable medium storing a program,
   the program causing a processor of a display apparatus, which includes: a backlight; a first panel configured to transmit light irradiated from the backlight; and a second panel configured to display an image on a screen by transmitting the light transmitted through the first panel, to execute:
   a step of setting a first region and a second region, different from the first region, of the screen in accordance with input by a user;
   a step of generating a second image by applying smoothing to at least a part of a first image; and
   a step of controlling a transmittance of the first panel based on the second image, wherein
   the method further comprises a step of differentiating a strength of the smoothing applied to a first image region of the first image corresponding to the first region and a second image region of the first image corresponding to the second region, such that, in the step of generating the second image, the strength of smoothing applied to the first image region of the first image is lower than the strength of smoothing applied to the second image region of the first image.

* * * * *